United States Patent
Shio

(10) Patent No.: US 7,758,844 B2
(45) Date of Patent: Jul. 20, 2010

(54) POROUS TITANIUM OXIDE POWDER AND METHOD FOR PRODUCTION THEREOF

(75) Inventor: Shoichiro Shio, Yokohama (JP)

(73) Assignee: Shiseido Company, Ltd., Chuo-ku, Tokyo (JP)

( * ) Notice: Subject to any disclaimer, the term of this patent is extended or adjusted under 35 U.S.C. 154(b) by 62 days.

(21) Appl. No.: 10/550,461

(22) PCT Filed: Mar. 26, 2004

(86) PCT No.: PCT/JP2004/004268

§ 371 (c)(1),
(2), (4) Date: Sep. 26, 2005

(87) PCT Pub. No.: WO2004/085315

PCT Pub. Date: Oct. 7, 2004

(65) Prior Publication Data

US 2006/0188432 A1     Aug. 24, 2006

(30) Foreign Application Priority Data

Mar. 27, 2003   (JP) ............................. 2003-089081

(51) Int. Cl.
*C01G 23/047* (2006.01)
*C01G 23/053* (2006.01)
*A61K 8/29* (2006.01)

(52) U.S. Cl. ....................... 423/610; 423/611; 423/612; 424/59; 424/70.9

(58) Field of Classification Search ................. 423/610, 423/611, 612, 615, 616; 424/59, 70.9
See application file for complete search history.

(56) References Cited

U.S. PATENT DOCUMENTS

| 4,732,750 | A  | * | 3/1988 | Olson et al. ................. 423/608 |
| 6,740,312 | B2 | * | 5/2004 | Chopin et al. ................. 424/59 |
| 2003/0162658 | A1 | * | 8/2003 | Domen et al. ............... 502/340 |

FOREIGN PATENT DOCUMENTS

| JP | 55-10428 | 1/1980 |
| JP | 2-196029 | 8/1990 |
| JP | 10-245228 | 9/1998 |
| JP | 2001-31422 | 2/2001 |
| JP | 2001-114519 | 4/2001 |
| JP | 2003-246620 | 9/2003 |

* cited by examiner

*Primary Examiner*—Stanley Silverman
*Assistant Examiner*—James Fiorito
(74) *Attorney, Agent, or Firm*—Rankin, Hill & Clark LLP

(57) ABSTRACT

There is provided a titanium oxide powder having excellent ultraviolet-protecting ability, usability and transparency, and a method of manufacturing the same. The titanium oxide powder provided is a porous titanium oxide powder that is formed from titanium oxide primary particles agglomerated together, has a mean particle diameter of 0.01 to 100 μm, and has a specific surface area of 250 to 500 $m^2/g$. The porous titanium oxide powder can be obtained by subjecting a titanium salt solution to hydrolysis by heating under the presence of an aliphatic alcohol and/or a substance having a carboxyl group or a carbonyl group, and then further carrying out heating treatment with an acid. The titanium oxide primary particles preferably have a mean particle diameter of 1 to 50 nm, and the powder preferably has an approximately spherical shape with the ratio of the minor axis to the major axis being at least 0.75.

10 Claims, 3 Drawing Sheets

POROUS TITANIUM OXIDE POWDER AND METHOD FOR PRODUCTION THEREOF

This application claims the priority of Japanese Patent Application No. 2003-89081 filed on Mar. 27, 2003, which is incorporated herein.

BACKGROUND OF THE INVENTION

1. Field of the Invention

The present invention relates to a porous titanium oxide powder and a method of manufacturing the same, and further relates to the ultraviolet-protecting ability, usability, transparency and so on of the porous titanium oxide powder.

2. Description of the Related Art

Titanium oxide has a high refractive index, and has excellent concealing ability, coloring ability and ultraviolet-protecting ability, and has thus been widely used from hitherto as a pigment in paints, plastics, cosmetics and so on. As the titanium oxide contained in bases for such products as an ultraviolet-protecting agent, fine particle powders having a mean primary particle diameter of not more than 0.1 μm have come to be predominantly used, this being as a result of striving for good ultraviolet-protecting ability and transparency.

As methods of manufacturing titanium oxide, a method in which titanyl sulfate or titanium tetrachloride is heated and thus hydrolyzed in an aqueous phase, a method in which neutralization and hydrolysis are carried out and soon are known (see, for example, Japanese Patent Application Laid-open No. 55-10428).

However, a fine particle powder has a very small particle diameter, and hence the oil absorption amount is high, and thus agglomeration readily occurs, and hence dispersion in a product base system has been difficult. Moreover, cosmetics and so on containing such a fine particle powder have had a high UV-B region (290 to 320 nm) ultraviolet-protecting effect, but have had a low protection effect against UV-A region (320 to 400 nm) ultraviolet rays, and moreover there have been problems in actual use such as graininess and poor spreadability.

Due to such a state of affairs, to improve the dispersibility and the UV-A protecting ability, a fan-shaped titanium oxide powder in which are agglomerated acicular titanium dioxide primary particles has been proposed (see, for example, Japanese Patent Application Laid-open No. 10-245228).

However, with such particles, an improvement in the UV-A protecting ability can be recognized, but problems have remained in terms of usability.

Moreover, because titanium oxide has a high refractive index, there has been a problem of the transparency being poor compared with zinc oxide and so on.

SUMMARY OF THE INVENTION

In view of the problems of the prior art described above, it is an object of the present invention to provide a titanium oxide powder having excellent ultraviolet-protecting ability, usability and transparency, and a method of manufacturing the same.

The present inventor carried out studies to attain the above object, and as a result ascertained that if a titanium salt solution is subjected to hydrolysis by heating together with an additive such as an aliphatic alcohol, and then heating treatment with an acid is carried out thereafter, then fine titanium oxide primary particles agglomerate into spheres, and a powder having a very high specific surface area is obtained. Furthermore, the present inventor has discovered that such a powder has excellent ultraviolet-protecting ability, usability and transparency. Moreover, the present inventor has also discovered that the particle diameter, the crystalline form and so on can be adjusted by using a substance having a carboxyl group or a carbonyl group as an additive together with the aliphatic alcohol, or adjusting the concentration of the additive. The present invention was thus accomplished.

Specifically, a porous titanium oxide powder according to the present invention is a porous powder that is formed from titanium oxide primary particles agglomerated together and has a mean particle diameter of 0.01 to 100 μm, the porous powder having a specific surface area of 250 to 500 m$^2$/g.

With the porous titanium oxide powder of the present invention, the titanium oxide primary particles preferably have a mean particle diameter of 1 to 50 nm.

Moreover, the powder preferably has an approximately spherical shape with the ratio of the minor axis to the major axis being at least 0.75. Moreover, it is favorable for the crystalline form to be rutile. Moreover, it is also favorable for the crystalline form to be anatase.

A method of manufacturing a porous titanium oxide powder according to the present invention comprises subjecting a titanium salt solution to hydrolysis by heating under the presence of an aliphatic alcohol and/or a substance having a carboxyl group or a carbonyl group, and then further carrying out heating treatment with an acid.

With the manufacturing method of the present invention, it is favorable to subject the titanium salt solution to hydrolysis by heating under the presence of an aliphatic alcohol, and then further carry out heating treatment with an acid.

Moreover, with the manufacturing method of the present invention, it is also favorable to subject the titanium salt solution to hydrolysis by heating under the presence of an aliphatic alcohol and a substance having a carboxyl group or a carbonyl group, and then further carry out heating treatment with an acid.

With the manufacturing method of the present invention, the aliphatic alcohol is preferably a polyhydric alcohol.

Moreover, the polyhydric alcohol is preferably at least one selected from the group consisting of ethylene glycol, propylene glycol, 1,4-butylene glycol, 2,3-butylene glycol, 1,3-butylene glycol, dimethylpropanediol, diethylpropanediol, glycerol, trimethylolpropane, triethylolpropane, erythritol, xylitol, mannitol, sorbitol and maltitol.

Moreover, with the manufacturing method of the present invention, it is also favorable to subject the titanium salt solution to hydrolysis by heating under the presence of a substance having a carboxyl group or a carbonyl group, and then further carry out heating treatment with an acid.

With the manufacturing method of the present invention, the substance having a carboxyl group or a carbonyl group is preferably an aliphatic carboxylic acid or a derivative thereof.

Moreover, the substance having a carboxyl group or a carbonyl group is preferably acetic acid.

Moreover, with the manufacturing method of the present invention, after the heating treatment with an acid, it is preferable to further carry out pH adjustment using an alkali.

DESCRIPTION OF THE PREFERRED EMBODIMENTS

Figure 1:
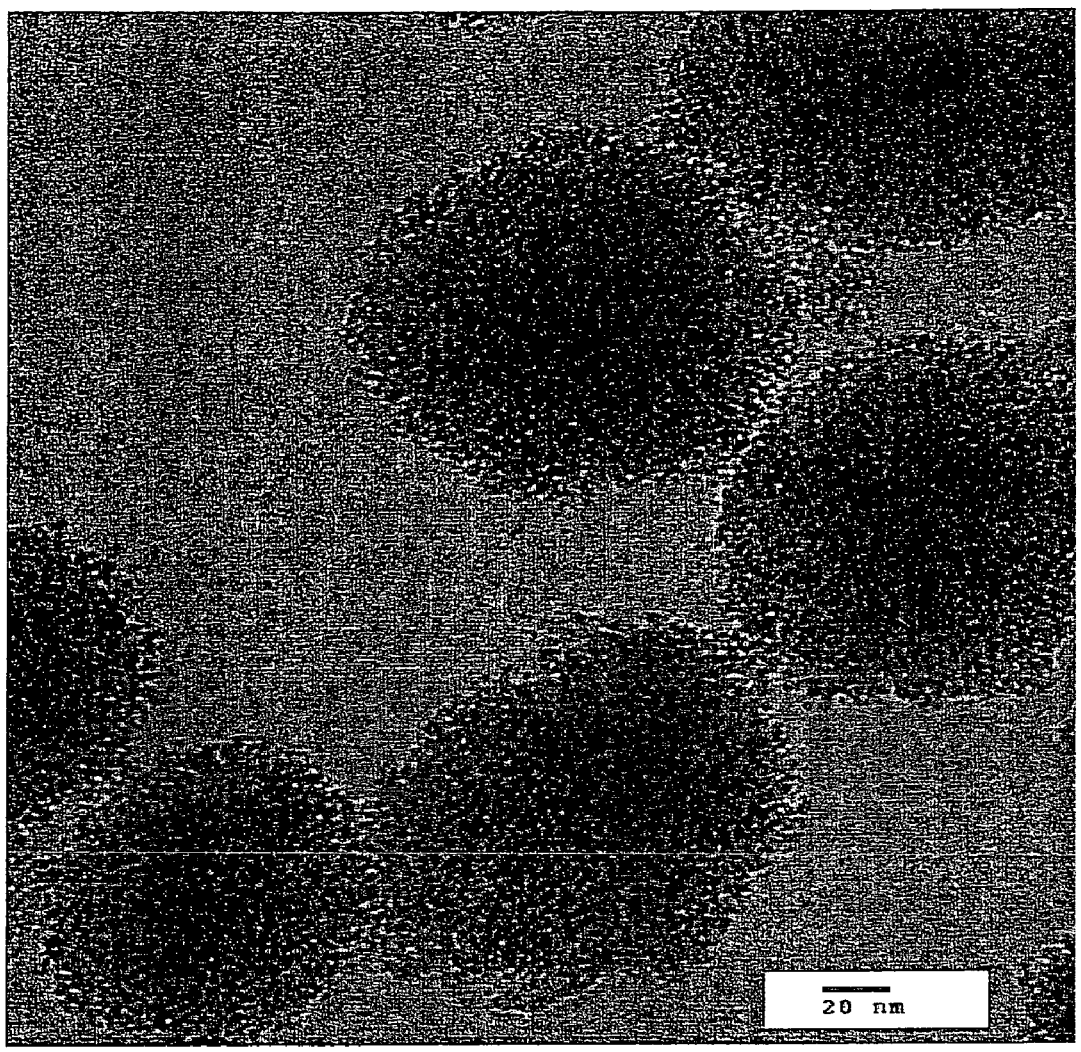
FIG. 1 is a transmission electron microscope (TEM) micrograph of a porous titanium oxide powder according to the present invention.

The porous titanium oxide powder of the present invention has a particle diameter of 0.01 to 100 µm, with 0.01 to 10 µm being preferable. If the particle diameter is too low then agglomeration in the base will be prone to occurring, whereas if the particle diameter is too high then the usability will be impaired.

Moreover, the titanium oxide particles that are the primary particles preferably have a mean particle diameter of 0.001 to 0.05 µm. In the case that this mean particle diameter is less than 0.001 µm, the tendency to agglomerate will be strong, and hence it will no longer be possible to obtain porosity, whereas in the case that this mean particle diameter is greater than 0.05 µm, the specific surface area will be low, and hence the ultraviolet-protecting effect will be low.

A method of manufacturing a porous titanium oxide powder of the present invention comprises subjecting a titanium salt solution to hydrolysis by heating under the presence of an aliphatic alcohol and/or a carbonylic substance having a carboxyl group or a carbonyl group, and then carrying out heating treatment with an acid. Specifically, for example, it is preferable to add the aliphatic alcohol or the like to the titanium salt solution, and heat the solution to carry out hydrolysis to obtain meta-titanic acid, further carry out heating treatment with an acid, and then carry out pH adjustment through alkali treatment to obtain ortho-titanic acid, and dry (and also possibly bake). Note that it is also possible to omit the alkali treatment, but the yield and product quality may be poor.

There are no particular limitations on the starting material of the titanium salt solution used in the present invention, but an aqueous solution of an inorganic titanium salt such as titanium sulfate, titanyl sulfate or titanium tetrachloride can be suitably used. Moreover, an organo-titanium salt such as titanium tetraisopropoxide can also be used as a starting material.

The concentration of the titanium salt solution is preferably 0.1 to 5 mol/L.

In the present invention, the particle diameter and specific surface area of the powder obtained can be changed through the amount added of the aliphatic alcohol added when subjecting the titanium salt solution to the hydrolysis by heating. It is thought that this is because the aliphatic alcohol has an effect on the particle diameter and state of agglomeration of the primary particles, and as a result the particle diameter, specific surface area and so on of the porous powder comprising secondary particles change.

The aliphatic alcohol concentration should be set as appropriate in accordance with the objective, but is generally 0.1 to 5 mol/L, preferably 0.5 to 3 mol/L, out of the titanium salt solution. In the case that the aliphatic alcohol concentration is too low or too high, it may be difficult to obtain a porous powder having the desired particle diameter and specific surface area.

In the present invention, examples of the aliphatic alcohol added when subjecting the titanium salt solution to hydrolysis by heating are ones having 1 to 22 carbon atoms; examples include methanol, ethanol, isopropyl alcohol, butyl alcohol, octanol and stearyl alcohol, but to obtain a nice shape it is preferable to use a polyhydric alcohol. There are no particular limitations on the polyhydric alcohol, but ethylene glycol, propylene glycol, 1,4-butylene glycol, 2,3-butylene glycol, 1,3-butylene glycol, dimethylpropanediol, diethylpropanediol, glycerol, trimethylolpropane, triethylolpropane, erythritol, xylitol, mannitol, sorbitol, maltitol and so on can be suitably used. A porous powder can be formed even if a monohydric alcohol is used, but it is difficult to obtain a powder having a shape as nice as that obtained with a polyhydric alcohol. In the case of using a monohydric alcohol, this aspect can be improved by also using a carboxyl/carbonyl compound as described later.

The conditions for the hydrolysis by heating are set as appropriate in accordance with the starting material used, the amount added, type and concentration of the aliphatic alcohol or the like, and so on, but in general 1 to 12 hours at 50 to 100° C. is suitable.

In the present invention, after the hydrolysis by heating, heating treatment with an acid is carried out. Specifically, after the hydrolysis by heating, the residue is filtered off and redispersed in water to obtain a slurry, an acid is added to the slurry, and heating is carried out. Examples of the acid include sulfuric acid, nitric acid and hydrochloric acid, with hydrochloric acid being preferable.

Through such heating treatment with an acid, a porous powder having a very high specific surface area of at least 250 $m^2/g$ can be obtained. In the case that such heating treatment with an acid is not carried out, or the additive comprising an aliphatic alcohol or the like is not added during the hydrolysis by heating, it is not possible to obtain a powder having such a high specific surface area. Moreover, through the heating treatment with an acid, the particle diameter of the powder tends to become lower and more uniform compared with before the treatment.

The amount added of the acid during the heating treatment with the acid is generally 1 to 8 mol equivalents relative to the titanium in the slurry. The heating conditions should be set as appropriate in accordance with the starting material used, the additives used, the concentrations thereof and so on, but are generally in similar ranges to the conditions for the hydrolysis by heating.

In the present invention, after the heating treatment with an acid, it is preferable to add an alkali to the reaction liquid (or a slurry obtained by filtering the reaction liquid, washing with water, and then redispersing in water), thus adjusting (neutralizing) to pH 6 to 8, preferably pH 6.5 to 7.5. There are no particular limitations on the alkali used; Na salts, K salts and Ca salts such as sodium hydroxide, sodium carbonate, potassium hydroxide and calcium hydroxide can be suitably used.

In the present invention, if a substance having a carboxyl group or a carbonyl group is made to be coexist with the aliphatic alcohol, then the particle diameter of the porous powder tends to become lower than in the case that such a substance having a carboxyl group or a carbonyl group is not used. Moreover, the amount used of the additive can also be reduced.

There are no particular limitations on the substance having a carboxyl group or a carbonyl group (hereinafter referred to as the 'carboxyl/carbonyl compound') so long as no particular impediment is caused. An aliphatic compound having 1 to 22 carbon atoms is suitable, with typical examples including aliphatic carboxylic acids and derivatives thereof. Examples of aliphatic carboxylic acids are monobasic acids such as formic acid, acetic acid, propionic acid, caprylic acid and stearic acid, dibasic acids such as oxalic acid, malonic acid, succinic acid, adipic acid and maleic acid, and also polybasic acids of higher basicity. Typical examples of derivatives include salts such as alkali metal salts, alkaline earth metal salts, and quaternary ammonium salts, and esters such as methyl esters and ethyl esters, but amino acids, amides and so on can also be used so long as no particular impediment is caused. Out of carboxylic acids and derivatives thereof, preferable ones are carboxylic acids and carboxylic acid salts, with particularly preferable ones being acetic acid and propionic acid.

The concentration of the carboxyl/carbonyl compound should be set as appropriate in accordance with the type of the compound and other conditions, but in general 0.1 to 5 mol/L out of the titanium salt solution is preferable, more preferably is 0.5 to 5 mol/L If the concentration is too low, then the effect of adding the carboxyl/carbonyl compound will not be exhibited, whereas if too much is added then an effect commensurate with this will not be exhibited.

Moreover, a porous titanium oxide powder can also be obtained if a carboxyl/carbonyl compound is used instead of an aliphatic alcohol as an additive. In this case, acetic acid is preferable as the carboxyl/carbonyl compound. Note that in the case of using a carboxyl/carbonyl compound instead of an aliphatic alcohol, the particle diameter and the shape may be poorer than in the case of using an aliphatic alcohol.

Titanium oxide has three crystalline forms, namely anatase, rutile and brookite, and industrially the anatase and rutile forms are manufactured as white pigments. Both of these crystalline forms are tetragonal, but the arrangement of the atoms in the unit cell is denser for the rutile form than the anatase form. Moreover, the rutile form is more stable than the anatase form, and the anatase form is converted into the rutile form upon heating at high temperature.

Moreover, it is known that titanium oxide acts as a photocatalyst upon irradiation with ultraviolet radiation in particular, and in the case of using titanium oxide as a deodorizing agent, a decolorizing agent, an anti-soiling function bestowing agent for making glass ultra-hydrophilic, or the like with an object of using the photocatalytic action, it is very effective to use the anatase form.

In the manufacturing method of the present invention, depending on the concentration of the aliphatic alcohol and/or the carboxyl/carbonyl compound, rutile-form or anatase-form titanium oxide can be obtained. For example, in the case of subjecting a titanium tetrachloride aqueous solution to hydrolysis by heating, if the concentration of the aliphatic alcohol or the carboxyl/carbonyl compound is low then the rutile form tends to be obtained, whereas if the concentration of the aliphatic alcohol or the carboxyl/carbonyl compound is high then the anatase form tends to be obtained. In this way, with the manufacturing method of the present invention, the crystalline form of the titanium oxide can be selected in accordance with the usage. Moreover, it is also possible to manufacture the anatase form using the manufacturing method of the present invention, and then convert this into the rutile form using an ordinary method.

With the titanium oxide powder of the present invention, the primary particles agglomerate together in a rough fashion, and hence the powder exhibits a porous form having a large number of pores (cavities), and thus has a specific surface area of at least 250 $m^2/g$. The refractive index of the powder thus becomes a combination of the refractive index of the titanium oxide and the refractive index of the medium, and hence the apparent refractive index is lower than that of the titanium oxide itself. As a result, the porous titanium oxide powder of the present invention has a high, roughly constant transmittance over the visible region, and has a higher transparency in the visible region than conventional titanium oxide powders. Moreover, the transmittance in the UV-AB regions is low, and hence the powder has an ultraviolet-protecting ability. Furthermore, the titanium oxide powder of the present invention has an approximately spherical shape, and hence has excellent usability, with no graininess, when blended into a paint, a plastic, a cosmetic or the like.

The titanium oxide powder of the present invention is porous, and thus has a very high specific surface area of 250 to 500 $m^2/g$. Increased activity can thus be expected in the case of use as a photocatalyst.

Note that the porous titanium oxide powder of the present invention can also be used after having been subjected to surface treatment using a conventional method. For example, aluminum treatment, silicone treatment, fatty acid soap treatment, dextrin fatty acid ester treatment, fluorine treatment or the like may be carried out. Moreover, by further coating the surface of the powder with another metallic species, it is possible to change the ultraviolet absorption characteristics.

The porous titanium oxide powder of the present invention is thermally and chemically stable, and oily components, water, powders, surfactants, lower alcohols, polyhydric alcohols, moisturizing agents, preservatives, polymers, antioxidants, fragrances, various drugs and so on can be blended therewith so long as this is within qualitative and quantitative ranges such that the effects such as the ultraviolet-protecting effect of the present invention are not impaired.

Examples of oily components that can be blended with the porous titanium oxide powder of the present invention are oily components that are commonly used in cosmetics. Examples include liquid fats, solid fats, waxes, hydrocarbons, higher fatty acids, higher alcohols, ester oils, and silicones, although there are no limitations thereto. Moreover, one or more of these oily components can be selected and used as deemed appropriate.

Examples of powders that can be blended with the porous titanium oxide powder of the present invention are powders that are commonly used in cosmetics. Examples include inorganic pigments, pearl pigments, metal powder pigments, organic pigments, and natural colorants, although there are no limitations thereto.

Examples of surfactants that can be blended with the porous titanium oxide powder of the present invention are surfactants, either ionic or not, that are commonly used in cosmetics. Examples include anionic surfactants, cationic surfactants, amphoteric surfactants, lipophilic nonionic surfactants, hydrophilic nonionic surfactants, and silicone type surfactants. Note, however, that there is no limitation to only these surfactants with the present invention. Moreover, one or more of these surfactants can be selected and blended in as deemed appropriate.

In the case of using the porous titanium oxide powder of the present invention blended into a cosmetic, there are no particular limitations on the form that the cosmetic may take; for example, the cosmetic may take any of various forms in accordance with the usage thereof such as a powder, a cream, a stick, a pencil or a liquid, and any of various cosmetics can be provided, for example a make-up base, a foundation, a face powder, a rouge, a lipstick, a mascara, an eye shadow, an eye liner, a cream, a milky lotion or a lotion.

As described above, according to the present invention, an aliphatic alcohol and/or a substance having a carboxyl group or a carbonyl group are made to be present as additive(s) when hydrolyzing a titanium salt such as titanyl sulfate or titanium tetrachloride, and heating treatment with an acid is further carried out, whereby a porous titanium oxide powder having a very high specific surface area and having excellent ultraviolet-protecting ability, usability and transparency can be obtained. Moreover, by using an aliphatic alcohol and a carboxyl/carbonyl compound together, or by adjusting the concentration of the additive, the particle diameter, the specific surface area and the crystalline form can be changed.

EXAMPLES

Following is a description of preferable examples of the present invention. Note, however, that the present invention is not limited to these examples.

Example 1

1 mol of glycerol was added to 1 L of a 1 mol/L titanium tetrachloride aqueous solution, and heating was carried out for 3 hours at 90° C. After that, the residue was filtered off and redispersed in 1 L of ion exchange water, 4 mol of hydrochloric acid was further added, and heating was carried out for 3 hours at 90° C. The solution was then adjusted to pH 7 using sodium hydroxide. After that, filtration, washing with water, and drying (105° C., 12 hours) were carried out, thus obtaining a powder.

A TEM micrograph of the titanium oxide powder obtained is shown in FIG. 1. This powder was porous titanium oxide having a rutile crystalline form, a particle diameter of approximately 90 nm, and a specific surface area of 361 $m^2/g$, and had a spherical shape.

Example 2

Powders were prepared as in Example 1, except that the glycerol concentration was changed. The results are shown in Table 1.

TABLE 1

| Glycerol (mol/L) | Shape | Particle diameter (μm) | Crystalline form | Specific surface area ($m^2/g$) |
|---|---|---|---|---|
| 0 | Fan-shaped or spherical with fissures | 1~5 | Rutile | 125 |
| 0.1 | Porous spherical (with agglomeration between secondary particles) | 0.3~2 | Rutile | 134 |
| 0.5 | Porous spherical | 0.04 | Rutile | 355 |
| 1 | Porous spherical | 0.09 | Rutile | 361 |
| 2 | Porous spherical | 0.10 | Anatase | 333 |
| 3 | Porous spherical (some loss of shape) | 0.06 | Anatase | 302 |
| 5 | Fine particle agglomerate (irregular shape, hardly any pores) | — | Anatase | 35 |

It can be seen from Table 1 that the particle diameter and the specific surface area change with the aliphatic alcohol concentration (glycerol concentration). In the case that the aliphatic alcohol is not added or the case that the aliphatic alcohol is added excessively, the specific surface area is low, and a spherical porous powder is not obtained. The aliphatic alcohol concentration should thus be 0.1 to 5 mol/L, preferably 0.5 to 3 mol/L.

Moreover, as is clear from Table 1, the crystalline form of the powder changes according to the amount added of the aliphatic alcohol.

Comparative Example 1

A powder was obtained as in Example 1, except that after the hydrolysis by heating, the sodium hydroxide treatment was carried out without first carrying out the hydrochloric acid treatment.

The powder obtained was a titanium oxide powder having a rutile crystalline form, a particle diameter of approximately 200 nm, and a specific surface area of 220 $m^2/g$.

Example 3

Figure 2:
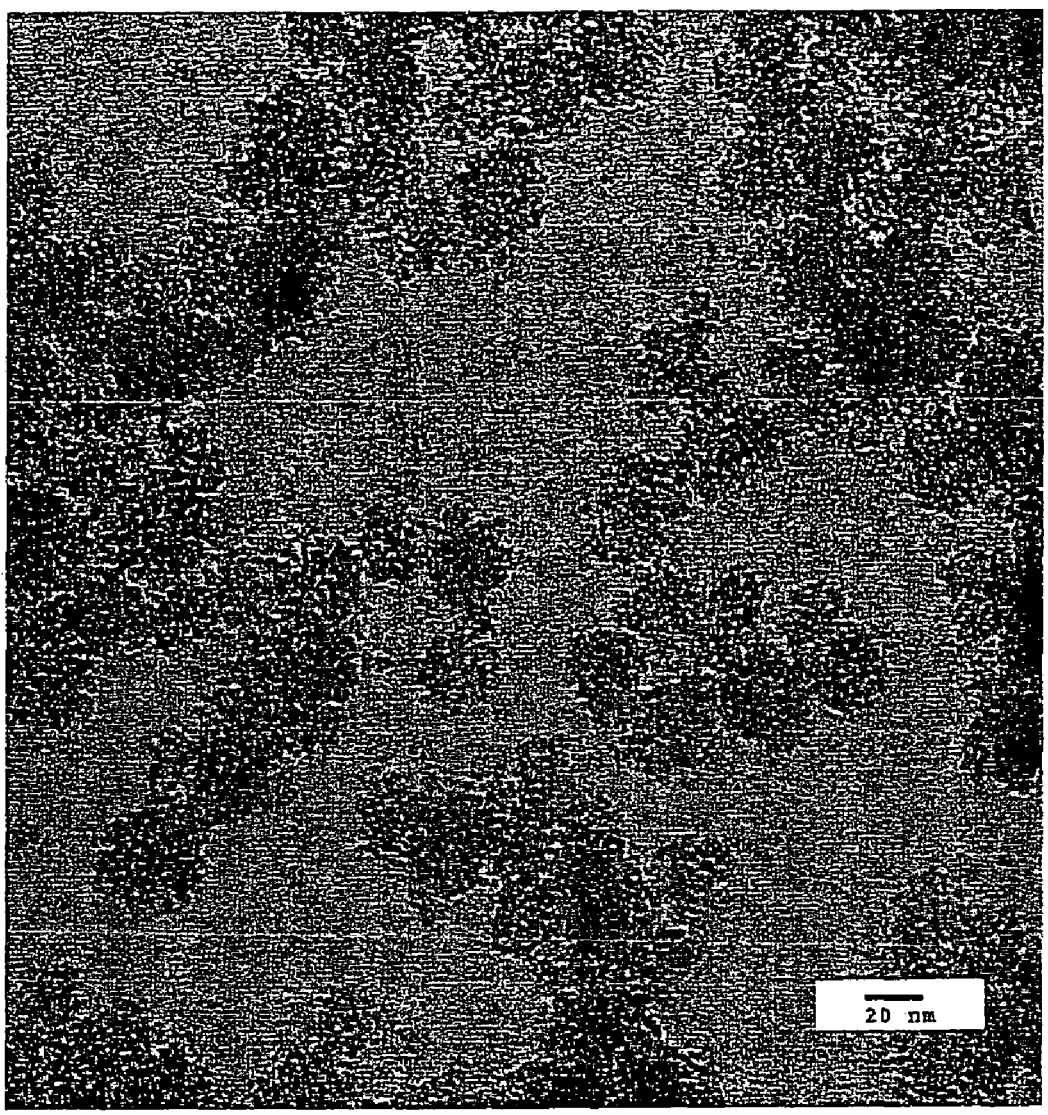
FIG. 2 is a transmission electron microscope (TEM) micrograph of a porous titanium oxide powder according to the present invention.

A powder was manufactured as in Example 1, except that 3 mol of acetic acid was added together with the glycerol, whereupon porous titanium oxide having an anatase crystalline form, a particle diameter of approximately 30 nm, and a specific surface area of 389 $m^2/g$ was obtained. A TEM micrograph of this powder is shown in FIG. 2.

As can be seen from comparing Example 3 and Example 1, upon using a carboxyl/carbonyl compound together with the aliphatic alcohol, the particle diameter became lower, and moreover the crystalline form changed from rutile to anatase.

Example 4

A powder was manufactured as in Example 1, except that 1 mol of propionic acid was added together with the glycerol, whereupon porous titanium oxide having a rutile crystalline form, a particle diameter of approximately 60 nm, and a specific surface area of 333 $m^2/g$ was obtained.

Example 5

3 mol of 1,3-butylene glycol was added to 1 L of a 1 mol/L titanium tetrachloride aqueous solution, and heating was carried out for 5 hours at 70° C. After that, the residue was filtered off and redispersed in 1 L of ion exchange water, 4 mol of hydrochloric acid was further added, and heating was carried out for 5 hours at 70° C. The solution was then adjusted to pH 7 using sodium hydroxide. After that, filtration, washing with water, and drying (105° C., 12 hours) were carried out, thus obtaining a powder.

This powder was porous titanium oxide having a rutile crystalline form, a particle diameter of approximately 20 nm, and a specific surface area of 334 $m^2/g$.

Example 6

A powder was manufactured as in Example 3, except that titanyl sulfate was used instead of titanium tetrachloride, whereupon porous titanium oxide having an anatase crystalline form, a particle diameter of approximately 60 nm, and a specific surface area of 327 $m^2/g$ was obtained.

Example 7

A powder was manufactured as in Example 3, except that the glycerol concentration was changed to 0.1 mol/L, whereupon porous titanium oxide having an anatase crystalline form, a particle diameter of approximately 10 nm, and a specific surface area of 455 $m^2/g$ was obtained.

Example 8

A powder was manufactured as in Example 1, except that acetic acid was used instead of glycerol, whereupon porous titanium oxide having an anatase crystalline form, particle diameters of approximately 20 nm and 600 nm, and a specific surface area of 285 $m^2/g$ was obtained.

Figure 3:
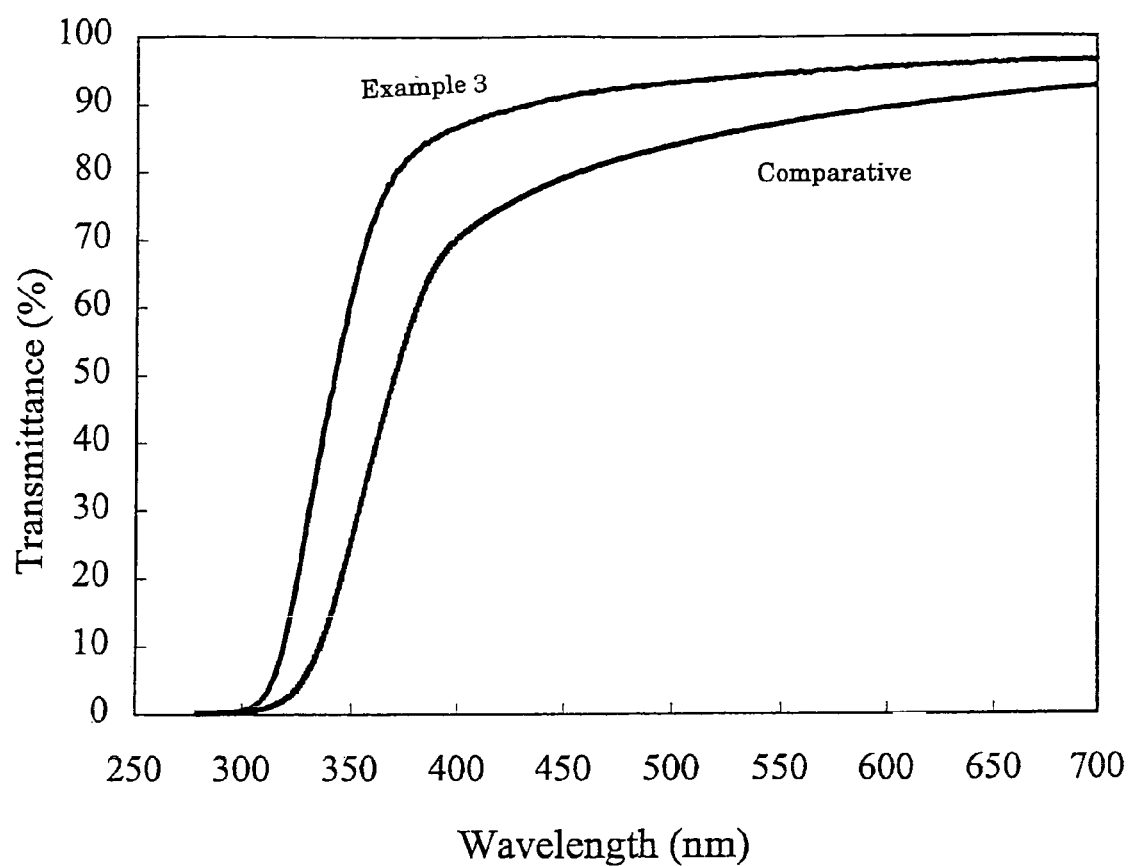
FIG. 3 is a graph showing ultraviolet-protecting effect and visible light transmittance measurement results for a porous titanium oxide powder according to the present invention and a comparative commercially sold ultra-fine particle titanium oxide powder.

FIG. 3 is a transmittance curve for the powder of Example 3. The transmittance measurements were carried out on a sample obtained by dispersing the powder in castor oil using three rollers to obtain a 5% dispersion, and applying the dispersion onto a transparent quartz plate using a 5 µm applicator. As a contrast, commercially sold ultra-fine particle titanium oxide (ST485 made by Titan Kogyo K. K.) was used. It can be seen from FIG. 3 that the powder of the present invention has good ultraviolet-absorbing ability, and has excellent transparency in the visible region.

Following is a description of cosmetics having a porous titanium oxide powder of the present invention blended therein. Note that the units for the numerical values shown in the recipes are mass %.

| [Recipe Example 1] O/W emulsion type sunscreen | |
|---|---|
| 1. Porous titanium oxide powder of present invention | 10 |
| 2. Flowers of zinc | 5 |
| 3. Stearic acid | 2 |
| 4. Cetyl alcohol | 1 |
| 5. Vaseline | 5 |
| 6. Silicone oil | 2 |
| 7. Liquid paraffin | 10 |
| 8. Glyceryl monostearate (self-emulsifying type) | 1 |
| 9. Polyoxyethylene (25 mol) monooleate ester | 1 |
| 10. Polyethylene glycol 1500 | 5 |
| 11. Beegamu | 0.5 |
| 12. Purified water | 57.5 |
| 13. Fragrance | Suitable amount |
| 14. Preservative | Suitable amount |

The polyethylene glycol was added to the purified water and was dissolved with heating, and then the flowers of zinc and the Beegamu were added, and dispersion was carried out to homogeneity using a homomixer and the temperature was held at 70° C. (aqueous phase). The other components were mixed together and dissolved with heating, and the temperature was held at 70° C. (oil phase) The oil phase was added to the aqueous phase, and emulsification and dispersion were carried out to homogeneity using a homomixer, and then after the emulsification the emulsion was cooled down to 35° C. while mixing. In this way, an O/W emulsion type sunscreen was obtained.

Sensory tests were carried out on the sunscreen obtained by a specialist panel of 10 persons, whereupon the evaluation obtained was that the feeling in use was good, and affinity to the skin was good, with there being no excessive whiteness remaining on the skin Moreover, the panelists were made to use the sunscreen for several days, thus testing the ultraviolet-protecting effect, whereupon the evaluation obtained was that the sunscreen was good, with no tanning occurring.

| [Recipe Example 2] Powder foundation | |
|---|---|
| 1. Porous titanium oxide powder of present invention | 12 |
| 2. Mica titanium | 6 |
| 3. Talc | 15 |
| 4. Sericite | 25 |
| 5. Iron oxide | 5 |
| 6. Spherical nylon powder | 2 |
| 7. Spherical PMMA powder | 4 |
| 8. Boron nitride powder | 1 |
| 9. Mica | Remainder |
| 10. Polyether-modified silicone | 0.5 |
| 11. Sorbitan sesquiisostearate | 1 |
| 12. Liquid paraffin | 3 |
| 13. Dimethylpolysiloxane | 1 |
| 14. Vaseline | 2 |
| 15. 2-ethylhexyl paramethoxycinnamate | 2 |
| 16. Glyceryl triisooctanoate | 0.5 |
| 17. Preservative | Suitable amount |
| 18. Fragrance | Suitable amount |

Above-mentioned components 1 to 9 were mixed to homogeneity, a solution obtained by heating and dissolving components 10 to 18 was added to the mixture and mixing was again carried out to homogeneity, and then the mixture was filled into a container, whereby a powder foundation was prepared. Upon carrying out sensory tests on this powder foundation, the evaluation obtained was that no excessive whiteness remained on the skin, the feeling in use was excellent, and there was a high ultraviolet-protecting effect.

| [Recipe Example 3] Lipstick | |
|---|---|
| 1. Porous titanium oxide powder of present invention | 8 |
| 2. Mica titanium | 4 |
| 3. Carnauba wax | 1 |
| 4. Candelilla wax | 2 |
| 5. Ceresin | 10 |
| 6. Glyceryl triisooctanoate | 9 |
| 7. Glyceryl diisostearate | 13 |
| 8. Dimethylpolysiloxane (viscosity 90,000 mPa · s at 25° C.) | 5 |
| 9. Dimethylpolysiloxane (viscosity 10 mPa · s at 25° C.) | 5 |
| 10. Silicone resin | 8 |
| 11. Squalene | Remainder |
| 12. Hydroxypropyl-β-cyclodextrin | 1 |
| 13. Cholesteryl macadamiate | 3.5 |
| 14. Synthetic sodium magnesium silicate | 0.5 |
| 15. Hydrophobic silica | 0.5 |
| 16. Purified water | 2 |
| 17. Colorant | Suitable amount |
| 18. Preservative | Suitable amount |
| 19. Fragrance | Suitable amount |

Components 14 and 15 were dispersed in component 13 which had been heated to 60° C., a uniform solution of components 12 and 16 was added to the dispersion and thorough stirring was carried out, and then a solution of components 3 to 11 that had been separately prepared by dissolving with heating was added, and further stirring was carried out. Components 1, 2 and 16 to 18 were then added, and stirring was carried out to obtain a dispersion, and then the dispersion was filled into a container, thus obtaining a lipstick. This lipstick had an excellent ultraviolet-protecting effect.

| [Recipe Example 4] W/O emulsified type sunscreen | |
|---|---|
| A components | |
| Octyl methoxycinnamate | 2.0 |
| Decamethylcyclopentasiloxane | 30.5 |
| Trimethylsiloxysilicate | 2.5 |
| Dimethyl silicone | 5.0 |
| POE polymethylsiloxane copolymer | 1.0 |
| Dimethyl stearyl ammonium hectorite | 0.7 |
| Stearic acid-treated porous titanium oxide (obtained by treating powder obtained in Example 1 with stearic acid) | 10.0 |
| B components | |
| 1,3-butanediol | 5.0 |
| Purified water | Remainder |
| (Manufacture and evaluation) | |

While stirring the A components in a homomixer, the B components were gradually added, thus carrying out emulsification, and obtaining a W/O emulsified type sunscreen.

Sensory tests were carried out on the sunscreen obtained by a specialist panel of 10 persons, whereupon the evaluation obtained was that the feeling in use was good, and affinity to the skin was good, with there being no excessive whiteness remaining on the skin. Moreover, the panelists were made to use the sunscreen for several days, thus testing the ultraviolet-protecting effect, whereupon the evaluation obtained was that the sunscreen was good, with no tanning occurring.

What is claimed is:

1. A porous titanium oxide powder that is formed from titanium oxide primary particles agglomerated together, said primary particles having a mean diameter of 0.01 to 100 microns, the porous titanium oxide powder having a specific surface area of 327 to 500 $m^2/g$; wherein the powder has an approximately spherical shape with the ratio of the minor axis to the major axis being at least 0.75.

2. The powder of claim 1, wherein the titanium oxide primary particles have a mean particle diameter of 1 to 50 nm.

3. The powder of claim 1, wherein the crystalline form of the titanium oxide primary particles is rutile.

4. The powder of claim 1, wherein the crystalline form of the titanium oxide primary particles is anatase.

5. The powder of claim 1, wherein the titanium oxide primary particles have a mean particle diameter of 1 to 100 nm.

6. The powder of claim 1, wherein the porous titanium powder further comprises one selected from the group consisting of aluminum, silicon, fatty acid soap, dextrin fatty acid ester, fluorine or a metal.

7. The powder of claim 1, wherein the porous titanium oxide powder further comprises one selected from the group consisting of oily components, water, a surfactant, alcohols, polyhydric alcohols, moisturizing agents, preservatives, polymers, antioxidants, fragrances, and drugs.

8. A method of making titanium oxide powder that is formed from titanium oxide primary particles agglomerated together, said primary particles made by subjecting a titanium salt solution to hydrolysis by heating in the presence of glycerol or 1,3-butylene glycol, said primary particles having a mean diameter of 0.01 to 100 microns, the porous titanium oxide powder having a specific surface area of 327 to 500 $m^2/g$; wherein the powder has an approximately spherical shape with the ratio of the minor axis to the major axis being at least 0.75.

9. The method of claim 8, wherein the titanium salt solution is subjected to hydrolysis by heating in the presence of glycerol.

10. The method of claim 8, wherein the titanium salt solution is subjected to hydrolysis by heating in the presence of 1,3-butylene glycol.

* * * * *